United States Patent [19]

Arai

[11] Patent Number: 5,784,104
[45] Date of Patent: Jul. 21, 1998

[54] AUTOMATIC FOCUSING DEVICE USING A VIDEO APERTURE SIGNAL IN LOW CONTRAST SITUATIONS

[75] Inventor: Hideyuki Arai, Kawasaki, Japan

[73] Assignee: Canon Kabushiki Kaisha, Tokyo, Japan

[21] Appl. No.: 473,955

[22] Filed: Jun. 7, 1995

Related U.S. Application Data

[63] Continuation of Ser. No. 155,633, Nov. 22, 1993, abandoned, which is a continuation of Ser. No. 845,961, Mar. 4, 1992, abandoned.

[30] Foreign Application Priority Data

Mar. 19, 1991 [JP] Japan ................... 3-052929

[51] Int. Cl.$^6$ ................................................. H04N 5/232
[52] U.S. Cl. ................... 348/353; 348/252; 348/625
[58] Field of Search ........................... 348/345, 349, 348/354, 355, 356, 252, 384, 353, 625, 618; 354/400, 402, 403; 396/98, 99, 108; H04N 5/232, 5/235

[56] References Cited

U.S. PATENT DOCUMENTS

| 3,562,424 | 2/1971 | Legler | 358/162 |
| 4,481,540 | 11/1984 | Bergen | 358/227 |
| 4,766,489 | 8/1988 | Kato | 355/98 |
| 4,843,472 | 6/1989 | Shinada | 358/164 |
| 5,023,646 | 6/1991 | Ishida et al. | 354/402 |
| 5,055,665 | 10/1991 | Baba et al. | 250/201.7 |
| 5,140,423 | 8/1992 | Lee | 358/162 |
| 5,412,424 | 5/1995 | Ejima et al. | 348/252 |

FOREIGN PATENT DOCUMENTS

| 62-14584 | 1/1987 | Japan | 358/162 |

*Primary Examiner*—Andrew I. Faile
*Assistant Examiner*—Tuan V. Ho
*Attorney, Agent, or Firm*—Fitzpatrick, Cella, Harper & Scinto

[57] ABSTRACT

An automatic focusing device which uses a video aperture signal in low contrast situations includes an extraction circuit for extracting a signal corresponding to a degree of focus from an input image signal. A focus control circuit is provided for detecting a focus state from the signal extracted from the extraction circuit, and for providing a driving signal for driving a focusing lens on the basis of the results of the detection. A determination circuit is provided for determining whether the image signal has a low contrast. An aperture signal extraction circuit extracts a video aperture signal from the input image signal. Control circuitry is provided for supplying the aperture signal output from the aperture signal extraction circuit to the focus control circuit on the basis of the results of the determination by the determination circuit.

18 Claims, 4 Drawing Sheets

AUTOMATIC FOCUSING DEVICE USING A VIDEO APERTURE SIGNAL IN LOW CONTRAST SITUATIONS

This application is a continuation of application Ser. No. 08/155,633 filed Nov. 22, 1993, which is a continuation of application Ser. No. 07/845,961 filed Mar. 4, 1992, both now abandoned.

BACKGROUND OF THE INVENTION

1. Field of the Invention

The present invention relates to an automatic focusing device suitable for use in a video camera or the like.

2. Description of the Related Art

Conventional automatic focusing devices for use in a video apparatus, such as a video camera, are of the so-called mountain-climbing type which extract a high-frequency component from a video signal obtained from an imaging device and drive a photographic lens such that the maximum high-frequency component is obtained for focusing the lens. Such an automatic focusing method has advantages in that it does not require a special optical member which must be used in other methods for focusing, and in that accurate focusing can be obtained regardless of the object distance. This type of automatic focusing method will be described in detail below with reference to FIG. 1.

In FIG. 1, a focusing lens 1 is moved in the direction of an optical axis A by means of a lens driving motor 12 and is thereby focused. The light which has passed through the lens 1 reaches the imaging surface of an imaging device 2 which photoelectrically converts it into a video signal. The video signal output from the imaging device 2 is amplified to a predetermined level by means of an amplifier 3, and is then input to a processing circuit (not shown) of a camera which converts it into a standard television signal. Also, the video signal amplified by the amplifier 3 is input to a band-pass filter (BPF) 4. The BPF 4 extracts a high-frequency component of the video signal. A gate circuit 5 extracts from that high-frequency component signal only a video signal corresponding to a focusing detection area defined in a part of the viewing screen, and a detector 6 detects the extracted video signal. A sample-hold circuit 7 performs sample holding at time intervals synchronized to an integral multiple of a vertical synchronizing signal (hereafter, this sample-held value is referred to as a focusing voltage value).

A motor speed determining circuit 10 sets the speed of the focusing motor 12 corresponding to the degree of focus on the basis of the focusing voltage value. That is, the motor speed determining circuit 10 instructs a motor driver 13 such that it changes the speed of the motor 12 in accordance with the degree of focus, i.e., such that the speed of the motor 12 is increased when the degree to which the lens is unfocused is great and the speed of the motor 12 is decreased when the degree to which the lens is unfocused is less. A motor operation direction determining circuit 9 sets the motor operation direction such that the maximum focusing voltage value is obtained. However, since the direction in which the maximum focusing voltage value is obtained is initially unknown, the motor 12 is initially operated in either direction. That is, the motor is initially continued to be operated until a determination can be made regarding the direction in which the maximum focusing voltage value is obtained. Where the lens 1 comes into contact with an end stop during that time, an end detector 14 detects the contact so that the motor 12 can be rotated in the opposite direction.

However, in the aforementioned conventional automatic focusing device, the lens cannot be focused to objects having a low contrast, because the level of the high-frequency components of the video signal representative of such objects is low and hence the focusing voltage value thereof is very low. The same problem occurs with objects containing horizontal stripes, such as a blind, because changes in the image in the horizontal direction are less in such objects and hence the level of the high-frequency components is low, as in the case of the objects of a low contrast.

SUMMARY OF THE INVENTION

A primary object of the present invention is to provide an automatic focusing device of the type which detects focusing with a high degree of accuracy and without generating an erroneous operation on the basis of a signal component corresponding to a degree of focus which is extracted from an image signal, and which is thereby capable of overcoming the aforementioned problems of the conventional technique.

A secondary object of the present invention is to provide an automatic focusing device which is capable of focusing a lens on an object having a low contrast or an object containing horizontal stripes, such as a blind, which would provide a unsharp image with the conventional automatic focusing device.

To achieve these objects, in one aspect of the present invention, there is provided an automatic focusing device which comprises extraction means for extracting a signal corresponding to a degree of focus from an image signal, drive means for driving a focusing lens on the basis of the signal extracted from the extraction means, determination means for determining a low contrast from the signal extracted from the extraction means, aperture signal extraction means for extracting an aperture signal of a video signal from the image signal, and control means for supplying the aperture signal output from the aperture signal extraction means to the drive means on the basis of the results of the determination by the determination means.

In another aspect of the present invention, there is provided an automatic focusing device in which, when a focusing voltage (which is the signal extracted from the image signal by means of the extraction means) is lower than a predetermined focusing voltage and is hence determined as a low contrast signal by the determination means, the aperture signal extracted from the aperture signal extraction means is added to the original image signal so that a signal corresponding to the degree of focus can be extracted from that signal. The focusing lens is driven by the obtained signal and optimum focusing can thus be obtained.

According to a further aspect of the present invention, an automatic focusing device includes extraction means for extracting a signal corresponding to a degree of focus from an input image signal. Focus control means are provided for detecting a focus state from the signal extracted from said extraction means, and for providing a driving signal for driving a focusing lens on the basis of the results of the detection. Determination means are provided for comparing an output of said extraction means with a predetermined value, and an aperture signal extraction means is provided for extracting a video signal aperture signal from the image signal. Control means are provided for supplying the aperture signal output from said aperture signal extraction means to said focus control means on the basis of the results of the determination by said determination means.

According to another aspect of the present invention, a video camera focusing apparatus includes imaging means for photoelectrically converting an object image into an image signal, and for outputting the image signal. An aperture correcting circuit is provided for emphasizing an aperture of the image signal, focusing means are provided for performing focusing on the basis of the output of said aperture correcting circuit.

According to yet a further aspect of the present invention, a video camera focusing apparatus comprises extraction means for extracting a signal corresponding to a degree of focus from an input image signal, first focus control means are provided for detecting a focus state from the signal extracted from said extraction means, and for outputting a driving signal for driving a focusing lens on the basis of the results of the detection. Aperture signal extraction means are provided for extracting a video signal aperture signal from the input image signal. Second focus control means are provided for outputting a driving signal for driving the focusing means using the aperture signal output from said aperture signal extraction means. Change-over means are provided for changing between the first and second focus control means in accordance with a detected photographing state.

Other objects and features of the invention will become apparent during the following discussion of the accompanying drawings.

DETAILED DESCRIPTION OF THE PREFERRED EMBODIMENT

An embodiment of an automatic focusing device according to the present invention will be described below with reference to FIGS. 2 through 4.

Figure 1:
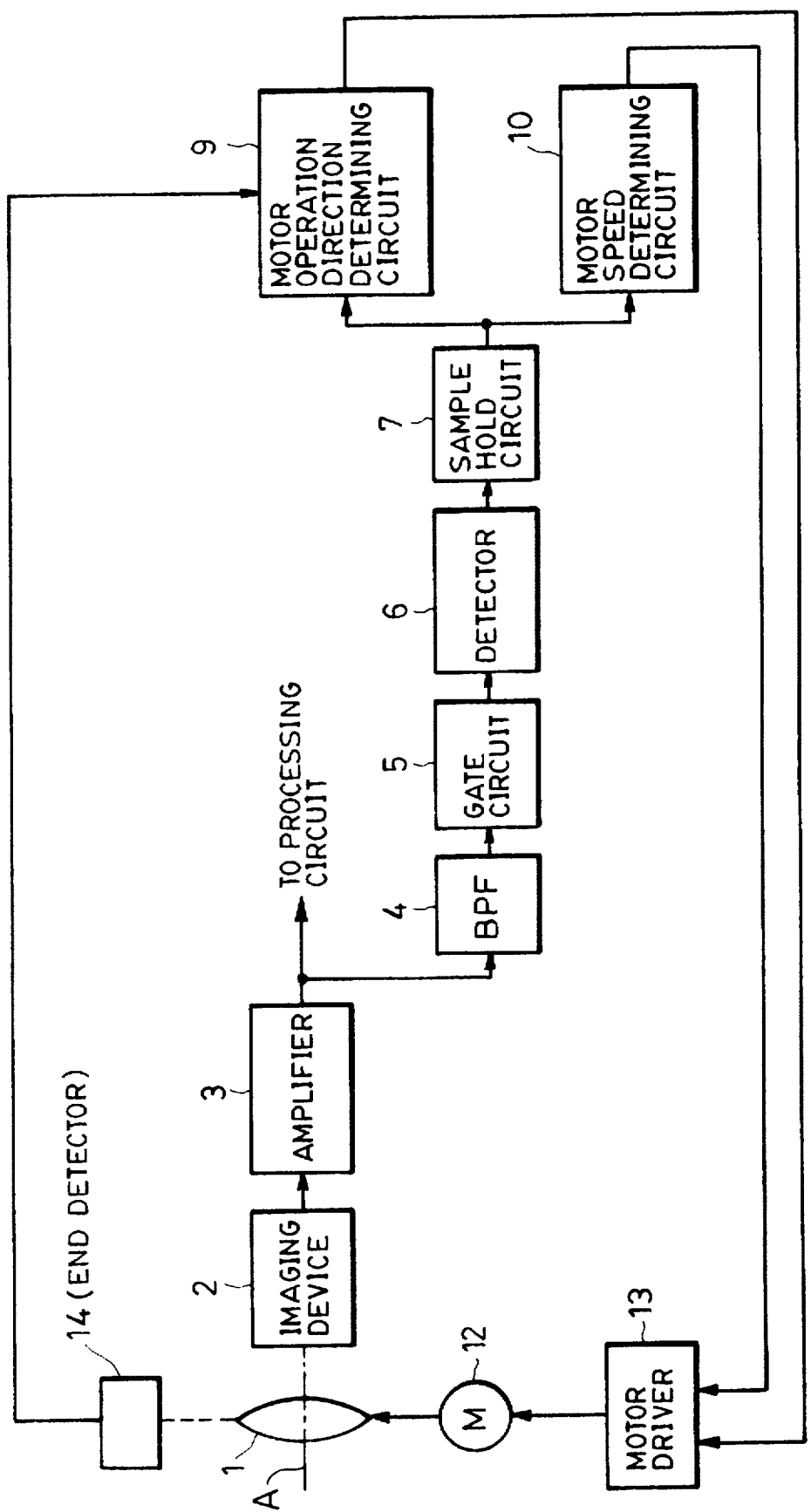
FIG. 1 is a block diagram of a conventional automatic focusing device.
Figure 2:
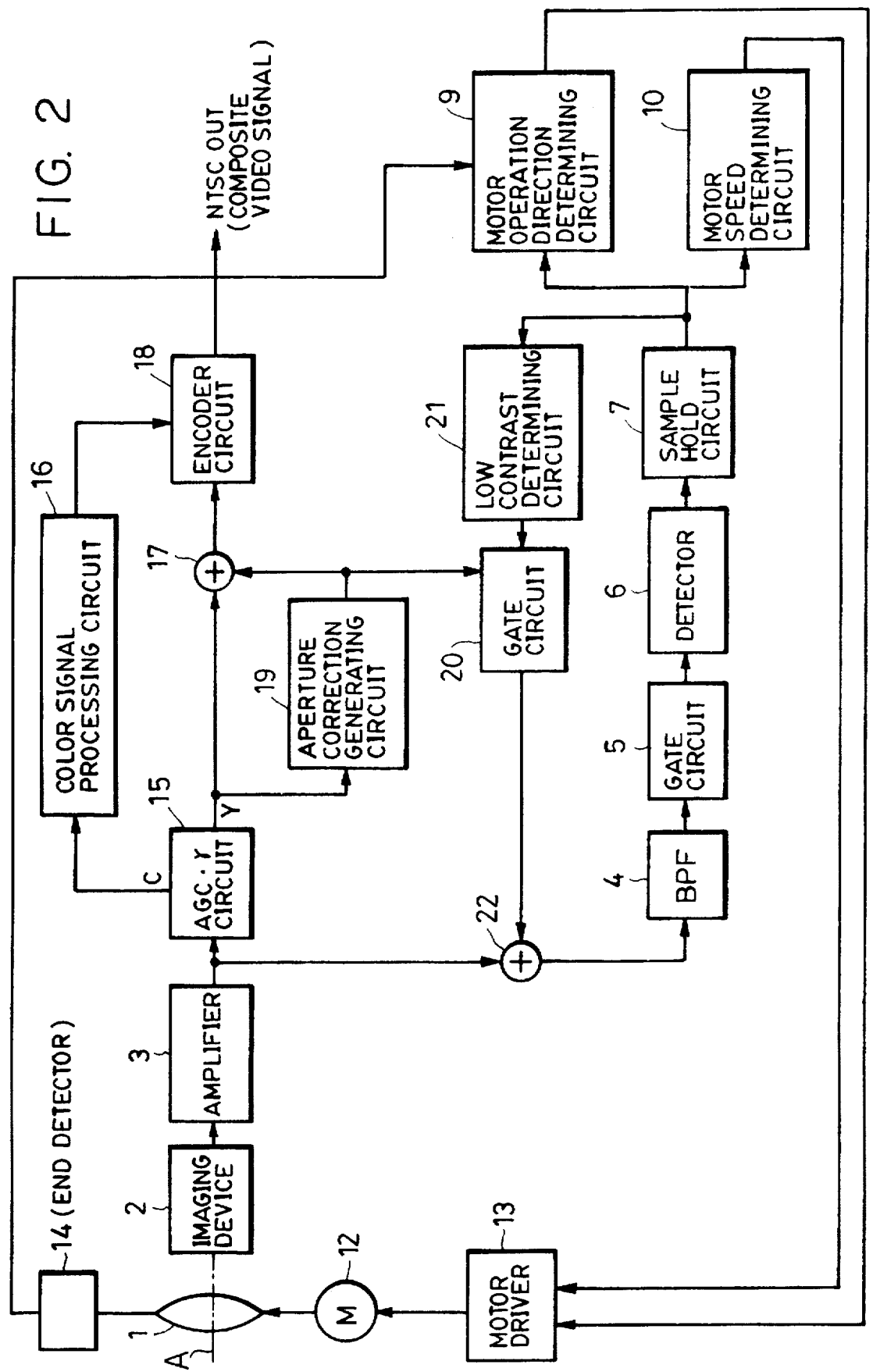
FIG. 2 is a block diagram of an embodiment of an automatic focusing device according to the present invention.
Figure 3:
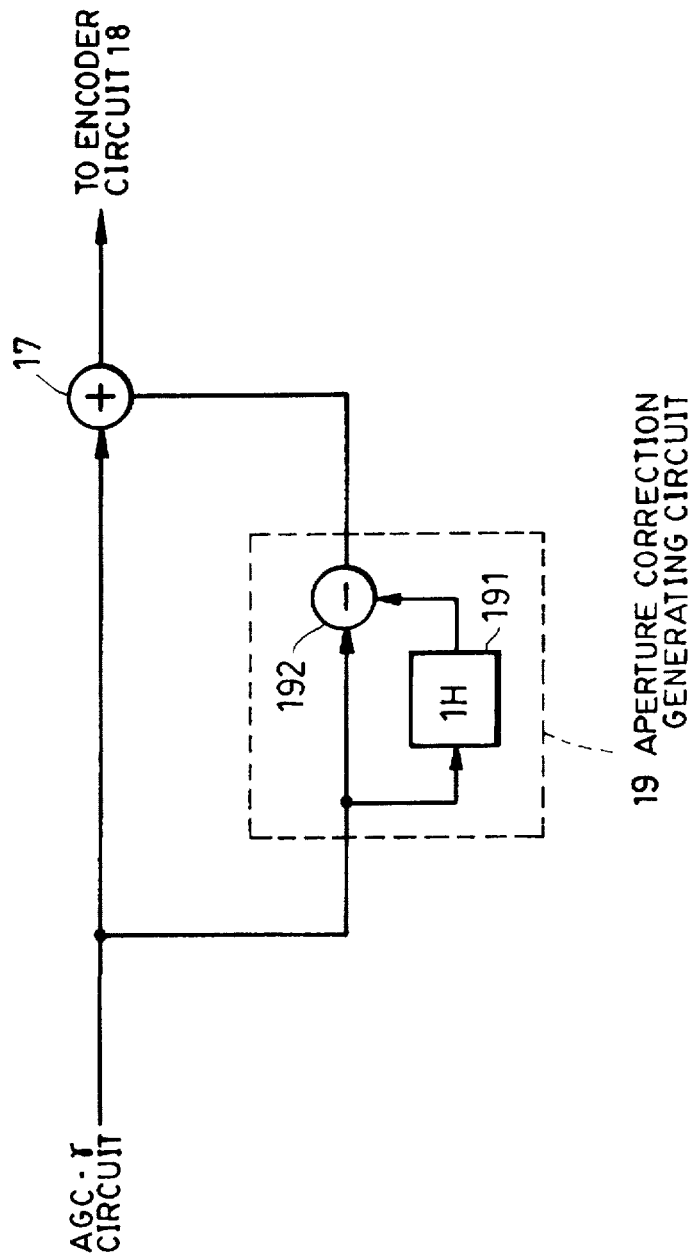
FIG. 3 is a block diagram of an aperture correcting circuit.

In FIGS. 2 and 3, the components designated by reference numerals 1 through 14 are the same as those shown in FIG. 1, and a further description thereof will be omitted.

The light which has passed through the lens 1 is input to the imaging device 2 which outputs a video signal. The video signal is amplified by the amplifier 3 and is then input to a AGC·γ circuit 15 which performs AGC (auto gain control) and γ correction and outputs both a luminance signal and a color signal. An aperture correction generating circuit 19 delays the luminance signal output from the AGC·γ circuit 15 and generates an aperture correcting signal (aperture signal). The generated aperture correcting signal is added to the luminance signal by an adder 17. The luminance signal with the profile correcting signal added thereto is input to an encoder (ENC) circuit 18 together with the color signal output from a color signal processing circuit 16. The encoder circuit 18 modulates these signals to output a composite video signal.

The video signal amplified by the amplifier 3 is input to the BPF 4 also through an adder 22. The BPF 4 extracts a high-frequency component of the video signal, and the gate circuit 5 extracts only the video signal corresponding to the focusing detecting area which is set at part of the screen. The detector 6 detects the obtained video signal, and the sample-hold circuit 7 sample holds the video signal and outputs a focusing voltage value.

FIG. 3 shows the internal structure of the profile correction generating circuit 19. The aperture correction generating circuit 19 includes a delay circuit 191 for delaying the video signal output from the AGC·γ circuit 15 by a predetermined time (for example, one horizontal scanning period), and a subtracter 192 for obtaining a difference between the video signal output from the AGC·γ circuit 15 and the delayed video signal output from the delay circuit 191.

Figure 4:
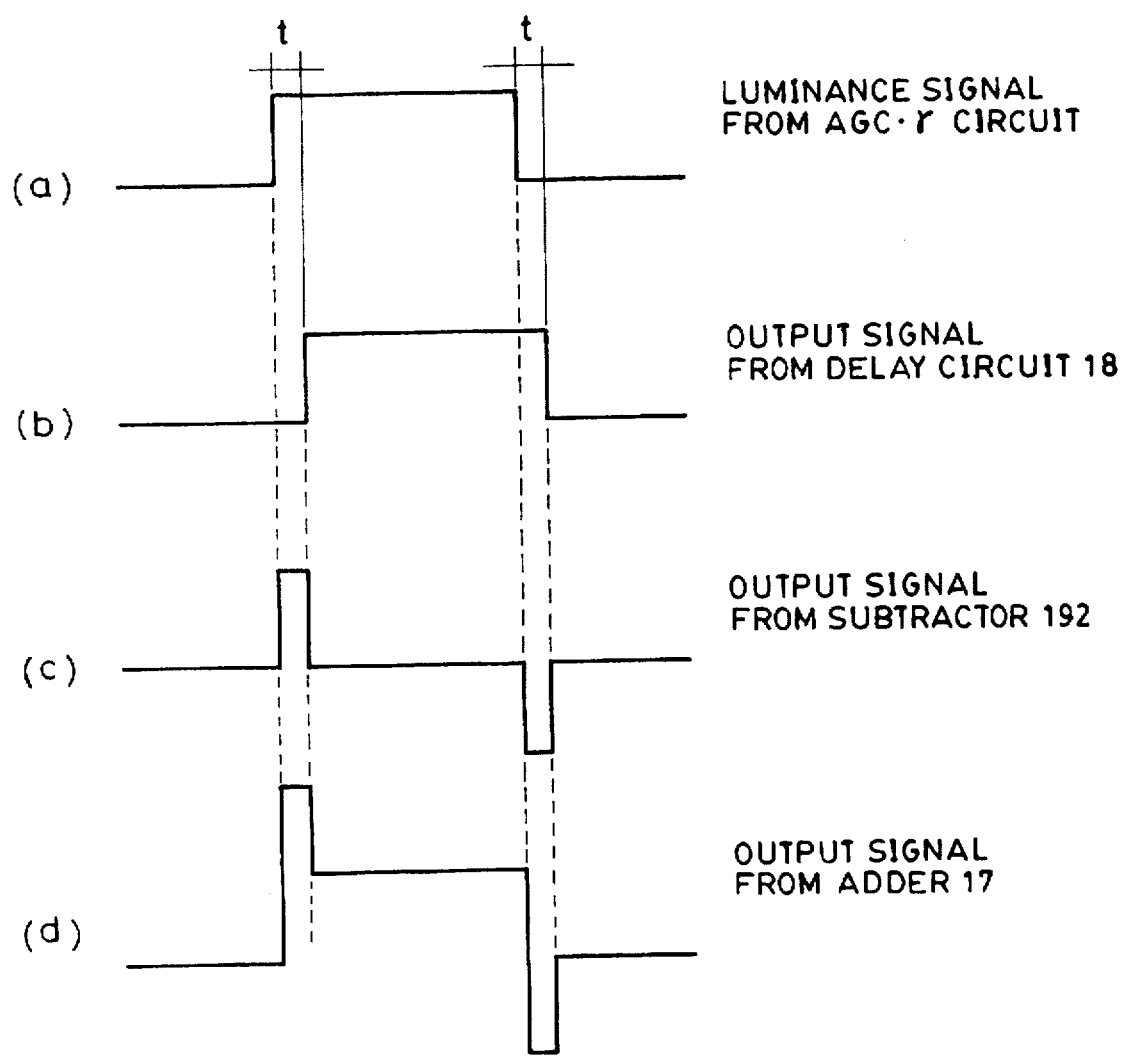
FIGS. 4(a) through 4(d) illustrate the signal waveforms used in the profile correcting circuit.

FIG. 4 shows the waveforms of the signals used in the aperture correction generating circuit 19. FIG. 4(a) shows the waveform of the luminance signal output from the AGC·γ circuit 15 and representative of one screen. FIG. 4(b) shows the waveform of the luminance signal which has been delayed by the predetermined time 't' by means of the delay circuit 191. FIG. 4(c) shows the waveform of the signal output from the subtracter 192. The subtracter 192 generates a pulse at each of the portions of the level of the luminance signal shown in FIG. 4(a) at which a rapid change takes place, i.e., at each of the portions corresponding to the aperture of the image.

The adder 17 adds the pulses shown in FIG. 4(c) to the original luminance signal shown in FIG. 4(a) and produces a luminance signal which has been emphasized at the aperture, as shown in FIG. 4(d).

Thus, when the image signal obtained from an object having a low contrast is passed through the profile correcting signal generating circuit, a sharp image whose contour has been emphasized can be obtained.

A motor speed determining circuit 10 sets the speed of the focusing motor 12 which corresponds to the degree of focus on the basis of the focusing voltage value. That is, the motor speed determining circuit 10 instructs a motor driver 13 such that it changes the speed of the motor 12 in accordance with the degree of focus, i.e., such that the speed of the motor 12 is increased when the degree at which the lens is unfocused is great and the speed of the motor 12 is decreased when the degree at which the lens is unfocused is less. A motor operation direction determining circuit 9 sets the motor operation direction such that the maximum focusing voltage value is obtained. However, since the direction in which the maximum focusing voltage value is obtained is initially unknown, the motor 12 is initially operated in either direction. That is, the motor 12 is initially continued to be operated until determination of the direction in which the maximum focusing voltage value is obtained can be made. If the focusing voltage value increases, the motor 12 is continued to be operated in that direction. If the focusing voltage value decreases, the direction of operation of the motor is reversed and the motor is operated in that direction until the maximum focusing voltage value is obtained.

In the case of an object having a low contrast or horizontal stripes, the sample-hold circuit 7 produces a low focusing voltage value. Consequently, focusing of the lens on the object may not be obtained, and hunting or malfunction may occur. More specifically, when the contrast of the object is low, the sharpness of the object image is low, thus lowering the focusing voltage level on the whole. At that time, even when the lens is focused, the focusing voltage level is not increased, and focusing detection disability may occur. When the object has horizontal stripes, like a blind, since the television signal is obtained by scanning the image in the horizontal direction, the image signal of such an object does not change in the horizontal direction, and the level of the high-frequency component is lowered, thus lowering the focusing voltage value, as in the case of the object having a low contrast.

Hence, the focusing voltage value is compared with a predetermined focusing voltage value that can be normally detected. If the focusing voltage value is lower than the predetermined value, a low contrast determining circuit 21 determines that the object has a low contrast or horizontal stripes, and controls a gate circuit 20 so that it passes the aperture correcting signal output from the aperture correcting signal generating circuit 19 therethrough. This aperture correcting signal is added to the video signal amplified by the amplifier 3 by means of the adder 22. Consequently, the pulse waveforms whose contour has been emphasized are supplied to the BPF 4 through the adder 22 and are used for focusing detection. Since the contour portion of an image contains a high-frequency component, focusing detection sensitivity of the focusing detecting circuit of the type which performs focusing detection by the level of the high-frequency component is enhanced, and focusing detection is thus facilitated. That is, if it is determined by the low contrast determining circuit 21 that the focusing voltage level is low and that the object has a low contrast or horizontal stripes, the aperture correcting signal is added to the original image signal so that a signal corresponding to the degree of focus can be extracted from that obtained signal. This assures optimum focusing.

As will be understood from the foregoing description, in the present invention, if it is determined that the object has a low contrast, the aperture correcting signal is added to the image signal so that the signal corresponding to the degree of focus can be extracted from that obtained signal. Consequently, an automatic focusing device according to the present invention is capable of focusing a lens on an object having a low contrast or an object having horizontal stripes, such as a blind, which would provide an unclear image in the conventional automatic focusing device, and thus exhibits a high-performance.

The individual components shown in outline or designated by blocks in the Drawings are all well-known in the automatic focusing arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An automatic focusing device, comprising:
   extraction means for extracting a signal corresponding to a degree of focus from an input image signal;
   focus control means for detecting a focus state from the signal extracted from said extraction means, and for providing a driving signal for driving a focusing lens in accordance with the results of the detection;
   determination means for determining whether said image signal has a low contrast;
   aperture signal extraction means for extracting a video aperture signal from the image signal by emphasizing a predetermined component of the image signal corresponding to edge portions of an image aperture; and
   control means for supplying the aperture signal output from said aperture signal extraction means to said focus control means when the results of the determination by said determination means indicate a low contrast.

2. The automatic focusing device according to claim 1, wherein said determination means compares a magnitude of the signal corresponding to the degree of focus with a predetermined magnitude, and wherein said control means supplies the aperture signal output from said aperture signal extraction means to said focus control means when it is determined by said determination means that the signal corresponding to the degree of focus has a smaller magnitude than said predetermined magnitude.

3. The automatic focusing device according to claim 2, wherein the signal corresponding to the degree of focus comprises a high-frequency component of the input image signal.

4. The automatic focusing device according to claim 1, wherein the aperture signal comprises a luminance signal that has been emphasized at portions where rapid chance occurs.

5. The automatic focusing device according to claim 1, further comprising image sensing means for outputting an image signal to be input to said extraction means, wherein said aperture signal extraction means comprises aperture correcting means for emphasizing the predetermined component of the image signal to form an emphasized signal and said control means comprises means for supplying the emphasized signal as the aperture signal to said focus control means.

6. The automatic focusing device according to claim 1, wherein said aperture signal extraction means comprises means for emphasizing a luminance signal at portions where rapid change occurs in the luminance signal.

7. An automatic focusing device, comprising:
   extraction means for extracting a focus signal corresponding to a degree of focus from an input image signal;
   focus control means for detecting a focus state from the signal extracted from said extraction means, and for providing a driving signal for driving a focusing lens in accordance with the results of the detection;
   determination means for comparing an output of said extraction means with a predetermined value;
   aperture signal extraction means for extracting a video aperture signal from the image signal by emphasizing a predetermined component of the image signal corresponding to edge portions of an image aperture; and
   control means for causing the aperture signal output from said aperture signal extraction means to be provided to said focus control means when the comparison by said determination means with the focus signal produces a predetermined result.

8. The automatic focusing device according to claim 7, wherein said control means supplies the aperture signal output from said aperture signal extraction means to said focus control means when it is determined by said determination means that the output of said extraction means has a lower level than said predetermined level.

9. The automatic focusing device according to claim 8, wherein the output of said extraction means comprises a high-frequency component of the input image signal.

10. The automatic focusing device according to claim 7, wherein said aperture signal extraction means comprises aperture correcting means for emphasizing a predetermined high-frequency component of the image signal.

11. A video camera focusing apparatus, comprising:

imaging means for photoelectrically converting an object image into an image signal, and for outputting the image signal;

an aperture correcting circuit for extracting and emphasizing a predetermined component of the image signal corresponding to edge portions of an image aperture; and focusing means for, in a low contrast situation, performing focusing using the emphazized predetermined component of said aperture correcting circuit image signal.

12. The video camera focusing apparatus according to claim 11, wherein said aperture correcting circuit outputs an aperture correcting signal in which a luminance signal has been emphasized at portions where rapid change occurs.

13. The video camera focusing apparatus according to claim 11, further comprising means for causing said focusing means to extract a high-frequency component from an image signal which has not been passed through said aperture correcting circuit, and to perform focusing using the extracted high-frequency component instead of the aperture correction circuit output.

14. The video camera focusing apparatus according to claim 13, further comprising change-over means for changing over said two focusing means in accordance with a detected photographing state.

15. A video camera focusing apparatus, comprising:

extraction means for extracting a focus signal corresponding to a degree of focus from an input image signal;

first focus control means for detecting a focus state from the signal extracted from said extraction means and for outputting a driving signal for driving a focusing lens using the results of the detection;

aperture signal extraction means for extracting and emphasizing a predetermined component of the image signal corresponding to edge portions of an image aperture and outputting the emphasized aperture signal;

second focus control means for outputting a driving signal for driving the focusing lens using the focus signal output from said extracting means and the aperture signal output from said aperture signal extraction means; and change-over means for changing between said first and second focus control means in accordance with a predetermined photographing state.

16. The video camera focusing apparatus according to claim 15, wherein said change-over means changes over to said first focus control means when a level of the signal corresponding to the degree of focus is equal to or higher than a predetermined level, and changes over to said second focus control means when the level of said signal is lower than the predetermined level.

17. The video camera focusing apparatus according to claim 16, wherein the signal corresponding to the degree of focus comprises a high-frequency component of the image signal.

18. The video camera focusing apparatus according to claim 15, wherein said aperture signal extraction means comprises aperture correcting means for emphasizing the predetermined component of the image signal to form an emphasized signal and said second focus control means comprises means for using the emphasized signal as the aperture signal.

* * * * *